US008012285B2

(12) United States Patent  
Goldstein et al.

(10) Patent No.: US 8,012,285 B2
(45) Date of Patent: Sep. 6, 2011

(54) POLYMERIC BINDERS HAVING SPECIFIC PEEL AND CURE PROPERTIES AND USEFUL IN MAKING CREPED WEBS

(75) Inventors: Joel Erwin Goldstein, East Brunswick, NJ (US); Ronald Joseph Pangrazi, Fleetwood, PA (US)

(73) Assignee: Wacker Chemical Corporation, Adrian, MI (US)

( * ) Notice: Subject to any disclaimer, the term of this patent is extended or adjusted under 35 U.S.C. 154(b) by 0 days.

(21) Appl. No.: 12/775,851

(22) Filed: May 7, 2010

(65) Prior Publication Data

US 2010/0215904 A1    Aug. 26, 2010

Related U.S. Application Data

(63) Continuation of application No. 11/602,426, filed on Nov. 20, 2006, now abandoned, which is a continuation-in-part of application No. 10/999,660, filed on Nov. 30, 2004, now abandoned, which is a continuation of application No. 10/025,114, filed on Dec. 19, 2001, now Pat. No. 6,824,635.

(51) Int. Cl.
*B31F 1/12* (2006.01)
*D06N 3/04* (2006.01)
*C08L 23/08* (2006.01)

(52) U.S. Cl. ......... 156/183; 8/114.5; 8/115.6; 8/115.54; 28/155; 162/111; 162/121; 428/152

(58) Field of Classification Search ................ 156/183; 8/114.5, 115.6, 115.54; 28/155; 162/111, 162/112; 428/152
See application file for complete search history.

(56) References Cited

U.S. PATENT DOCUMENTS

| 3,879,257 | A | | 4/1975 | Gentile et al. |
| 3,903,342 | A | * | 9/1975 | Roberts, Jr. ............ 428/153 |
| 4,057,669 | A | * | 11/1977 | McConnell ............. 428/152 |
| 4,322,516 | A | * | 3/1982 | Wiest et al. ............ 526/307.7 |
| 5,091,102 | A | | 2/1992 | Sheridan |
| 5,674,590 | A | | 10/1997 | Anderson et al. |
| 5,776,306 | A | | 7/1998 | Hepford |
| 5,800,765 | A | | 9/1998 | Bradt |
| 6,197,878 | B1 | * | 3/2001 | Murray et al. .......... 524/804 |
| 6,375,889 | B1 | | 4/2002 | Holmes et al. |

* cited by examiner

*Primary Examiner* — Kelechi C Egwim
(74) *Attorney, Agent, or Firm* — RatnerPrestia

(57) ABSTRACT

This invention is directed to alkylphenol ethoxylate (APE)-free polymer binders formed by aqueous free radical emulsion polymerization and having specific peel and cure properties. The APE-free polymeric binders have a peel value, when adhered to a heated metal surface, of 35% to 200% of the peel value shown by a standard APE-based polymer binder control and exhibit a cure profile such that at least 55% cure is achieved within 30 seconds at a temperature required for cure, and a wet tensile strength at 30-seconds of cure of at least 1000 g/5 cm. Wet tensile strength is used as a measure of cure. Binders having the peel and cure properties described herein can be considered for use in crepe processes, especially DRC processes.

10 Claims, No Drawings

POLYMERIC BINDERS HAVING SPECIFIC PEEL AND CURE PROPERTIES AND USEFUL IN MAKING CREPED WEBS

CROSS REFERENCE TO RELATED APPLICATIONS

This application is a continuation of U.S. patent application Ser. No. 11/602,426, filed on Nov. 20, 2006, which is a continuation-in-part of U.S. patent application Ser. No. 10/999,660, filed on Nov. 30, 2004, which is a continuation of U.S. patent application Ser. No. 10/025,114, filed on Dec. 19, 2001, now U.S. Pat. No. 6,824,635 B2, issued Nov. 30, 2004, all of which are hereby incorporated by reference.

BACKGROUND OF THE INVENTION

Crepe processes, especially double recrepe (DRC) processes, have been used to produce paper products, such as paper towels and wipes, with specific properties. The DRC process involves creping a base sheet or nonwoven web on a drum, printing a polymeric binder on one side of the sheet, flash drying the binder, creping the base sheet on a drum again, printing a polymeric binder on the other side of the base sheet, flash drying the binder, and then creping the base sheet a third time. The base sheet is printed while traveling through gravure nip rolls. Various crepe processes and binding materials used in the processes are known. Examples of such processes are disclosed in U.S. Pat. No. 3,879,257, U.S. Pat. No. 3,903,342, U.S. Pat. No. 4,057,669, U.S. Pat. No. 5,674,590, and U.S. Pat. No. 5,776,306.

In order for the base sheet or web to adhere adequately to the creping drum, polymeric binders used in creping processes are typically emulsion polymers containing surfactants that are based on alkylphenol ethoxylates (APEs). Known emulsion polymeric binders, that are free of alkylphenol ethoxylates, have not been effective in creping processes, especially DRC processes, because they do not provide the necessary adhesion to creping drums, produce an unacceptable amount of foam, are too low in viscosity, decompose at elevated temperatures causing an unacceptable odor, do not give acceptable tensile performance, and/or are subject to felt filling.

Appropriate binders for making paper products using a crepe process should be free of APE-based surfactants, adhere to a creping drum, provide a high degree of softness and absorbency to the finished product, provide acceptable tensile strength, and not felt-fill.

Heretofore, specific measurable properties for predicting the effectiveness of binders for a crepe process have not been reported.

BRIEF SUMMARY OF THE INVENTION

This invention is directed to APE-free polymer binders formed by emulsion polymerization techniques and having a specific peel value and a specific cure profile. Binders having the peel value and cure profile described herein can be considered for use in crepe processes, especially DRC processes. According to this invention, the APE-free polymeric binders have a peel value, when adhered to a heated metal surface, of 35% to 200% of the peel value shown by a standard APE-based polymer binder control (i.e., AIRFLEX® 105 vinyl acetate-ethylene (VAE) polymer emulsion) and exhibit a cure profile such that at least 55% cure is achieved within 30 seconds at a temperature required for cure. The peel value is determined by a modified release and adhesion test.

Wet tensile strength is used to determine the cure profile. Cure is described herein as reacting under time, temperature and catalytic conditions to produce a maximized performance level of the binder. The conditions used to simulate cure involve a temperature of about 320° F. (160° C.), an acid catalyst at about a 1% level based on the solids content of the binder, and time, in seconds, up to 180 seconds (3 minutes). The cure rate profile can be plotted by measuring wet tensile strength of bonded nonwoven substrates at various levels of cure time. It is desirable that the cured material reaches at least 55% of its ultimate wet tensile properties at 30 seconds of cure. The cure profile is dependent on time, temperature, and catalysis. Those variables can be varied to meet the requirements of performance. For instance, one could use less time and higher temperature or catalyst. Also, one could use no catalyst and rely on temperature or time to provide the needed cure. It has been shown that lower cure temperatures and other reaction routes are also capable of providing acceptable levels of performance. Temperatures as low as 200° F. (93° C.) have been shown to be acceptable for producing effective products as determined by finished wet tensile strength.

Binders having the properties described above are excellent candidates for use in crepe, especially DRC, processes. When used in making paper products, they should adhere to the creping drum providing a high degree of softness and absorbency to the finished paper product and not felt-fill; thus reducing production breaks, while ensuring that the desired finished product performance is manufactured.

DETAILED DESCRIPTION OF THE INVENTION

Any APE-free polymer prepared according to well known emulsion polymerization techniques and manifesting the requisite cure profile and peel value is suitable in this invention.

APE-free polymer emulsions can be formed by polymerizing one or more ethylenically unsaturated monomers and optionally one or more crosslinking monomers, under emulsion polymerization conditions, in the presence of a combination of a specific anionic surfactant and a specific nonionic surfactant, wherein said anionic surfactant is a sodium laureth sulfate having 1 to 12 moles of ethylene oxide, said nonionic surfactant is a secondary alcohol ethoxylate containing 7 to 30 moles of ethylene oxide or an ethoxylated branched primary alcohol containing 3 to 30 moles of ethylene oxide, said primary or secondary alcohol containing 7 to 18 carbons Ethylenically unsaturated monomers that can be used in the preparation of the polymer emulsions of this invention include, but are not limited to, vinyl esters, such as vinyl acetate, ethylene, styrene, butadiene, $C_{1-8}$ alkyl esters of acrylic and methacrylic acid, such as methyl(meth)acrylate, ethyl(meth)acrylate, butyl(meth)acrylate, hexyl(meth)acrylate, 2-ethylhexyl(meth)acrylate, diacrylates, unsaturated carboxylic acid, such as acrylic, methacrylic, crotonic, itaconic, and maleic acid, acrylonitrile, and vinyl esters of $C_{2-10}$ alcohols.

The polymer can contain up to 10% of one or more crosslinking monomers. Examples of crosslinking monomers are N—($C_{1-4}$) alkylol(meth)acrylamide, such as N-methylol acrylamide, i-butoxy methylacrylamide, acrylamidoglycolic acid, acrylamidobutyraldehyde, and the dialkyl acetal of acrylamidobutyraldehyde in which the alkyl can have 1 to 4 carbons. Any of the crosslinking monomers can be used alone, together, or in combination with acrylamide.

Polymer emulsions comprising 50 to 90 wt % (preferably 70 to 85 wt %) vinyl acetate, 5 to 44 wt % (preferably 10 to 30 wt %) ethylene, and 1 to 10 wt % (preferably 3 to 8 wt %) one or more crosslinking monomer, based on the total weight of monomers, can be formed using the surfactant package described herein.

The emulsion polymerization may be conducted in a stage or sequential manner and can be initiated by thermal initiators or by a redox system. A thermal initiator is typically used at temperatures at or above about 70° C. and redox systems are preferred at temperatures below about 70° C. The amount of thermal initiator used in the process is 0.1 to 3 wt %, preferably more than about 0.5 wt %, based on total monomers. Thermal initiators are well known in the emulsion polymer art and include, for example, ammonium persulfate, sodium persulfate, and the like. The amount of oxidizing and reducing agent in the redox system is about 0.1 to 3 wt %. Any suitable redox system known in the art can be used; for example, the reducing agent can be a bisulfite, a sulfoxylate, ascorbic acid, erythorbic acid, and the like. Examples of oxidizing agent are hydrogen peroxide, organic peroxides, such as t-butyl peroxide or t-butyl hydroperoxide, persulfates, and the like.

Effective emulsion polymerization reaction temperatures range from about 50 and 100° C.; preferably, 75 to 90° C., depending on whether the initiator is a thermal or redox system.

The specific combination of anionic and nonionic surfactants for the emulsion polymerization process has been shown to produce crosslinking polymer emulsions that are effective as binders in a creping process, especially a DRC process. The anionic surfactant is a sodium laureth sulfate having 1 to 12, preferably 2 to 5, moles of ethylene oxide. An example of an appropriate anionic surfactant is Disponil FES 32 IS (sodium laureth sulfate containing 4 moles of ethylene oxide), supplied by Cognis as a 30% aqueous solution. The nonionic surfactant is a secondary alcohol ethoxylate, such as 2-pentadecanol ethoxylate, containing 7 to 30 moles, preferably 12 to 20 moles, of ethylene oxide or an ethoxylated branched primary alcohol, such as tridecanol ethoxylate, containing 3 to 30 moles, preferably 9 to 20 moles, of ethylene oxide. The primary or secondary alcohol can contain 7 to 18, preferably 9 to 14 carbons. An example of an appropriate nonionic surfactant is Tergitol 15-S-20 (a secondary alcohol ethoxylate containing 20 moles of ethylene oxide), supplied by Dow as an 80% aqueous solution.

The amount of active surfactant, based on total polymer, can be 1 to 5 wt % (preferably 1.5 to 2 wt %) for the anionic surfactant and 0.25 to 5 wt % (preferably 0.5 to 1.5%) for the nonionic surfactant. The weight ratio of anionic to nonionic surfactant can range from 4:1 to 1.5:1. A weight ratio of 65:35 (anionic:nonionic surfactant) has been found to give a latex that provides appropriate adhesion to creping drums, has a moderate viscosity with little foam generation, results in less off-gassing than APE-based latexes, and has an accelerated sedimentation of no greater than 1%.

The peel value of prospective polymeric binders for use in crepe processes, especially DRC processes can be measured using the following adhesion and release procedure:

Attach a 2-inch×6-inch×1/32-inch stainless steel plate to a movable heated (270° F.; 132° C.) inclined (for example, 45° angle) metal platform and allow the plate to equilibrate to the temperature of the platform (~2 minutes.) Apply approximately 0.42 g of the polymer emulsion to a 1½-inch×6-inch piece of bleached, mercerized cotton poplin. Attach the jaws of a Testing Machine, Inc. gram tensile measuring apparatus to one of the long ends of the cotton poplin. Press the coated side of the coated cotton poplin onto the heated stainless steel plate with a 3-pound lab roller by rolling the lab roller back and forth over the substrate for 10 seconds. After 30 seconds, move the stainless steel plate away from the tensile measuring device (to which the substrate is attached) at a rate of 12 inches/minute (30.48 cm/minute). Record the amount of force needed to remove the cotton from the stainless steel plate and compare it to AIRFLEX 105 VAE emulsion control.

The AIRFLEX 105 polymer emulsion can be prepared in small batches as follows: Initially charge a one-gallon, stirred, stainless steel reaction vessel with 883.5 g of deionized water, 305 g of Polystep OP-3S surfactant mixture (20% active) of octylphenol ethoxylate (3 moles) and sodium sulfate salt of octylphenol ethoxylate (3 moles), supplied by Stefan, 0.91 g of sodium citrate, 3.5 g of 50% aqueous citric acid, 2.3 g of 5% aqueous ferric ammonium sulfate, and 312.0 g of vinyl acetate. While stirring, introduce 240.0 g of ethylene below the surface of the liquid in the reaction vessel in order that the interpolymers have a vinyl acetate:ethylene ratio of about 80:20. Heat the reaction vessel to 50° C. Upon equilibration, add the following four aqueous solutions intermittently to the reaction vessel over the course of the reaction (on a delay basis); 15% sodium formaldehyde sulfoxylate (SFS), 3.0% t-butylhydroperoxide (t-bhp), 1246.0 g of vinyl acetate and 324.0 g of a 30% aqueous solution of N-methylol acrylamide (NMA). After three hours, terminate the vinyl acetate delay. Complete the NMA delay after four hours, and continue the other two delays for another 30 minutes. Terminate the reaction by cooling.

The cure profile is determined by measuring wet tensile strength. The following procedure can be followed:

A 2-inch×6-inch unbonded DRC basesheet at about 65 gsm basis is coated with a binder and the binder is cured at 320° F. (160° C.) for 30 seconds and for 180 seconds. The cup of a Finch Wet Strength apparatus from Thwing-Albert, Philadelphia, is filled with an aqueous solution containing approximately 1% active Aerosol OT-75 wetting surfactant (from Cytec Industries). The cured coated basesheet is then placed around the bar on the Finch cup attachment and the two long ends of the sample are clamped to the top jaw. The Finch cup holder is pulled over the middle of the coated basesheet and the coated basesheet is allowed to soak in the aqueous surfactant solution for 15 seconds. The coated basesheet is then pulled away from the bar until the basesheet breaks. The force required to break the basesheet is recorded. If the wet tensile strength of the bound basesheet cured for 30 seconds is at least 75% the wet strength of the 180-second cured bound basesheet, the binder will not felt-fill due to insufficient cure. For purposes of evaluating binders for use in a crepe process, at least 55% of the ultimate wet tensile strength is achieved within 30 seconds at the cure temperature.

There is a minimum level of wet tensile performance that needs to be attained to produce a nonwoven fabric that can perform its intended functions; for example, a towel or wipe. For this invention, at a binder add-on of 3 to 20% (preferably 5 to 15%), the cured polymer binder onto a suitable cellulosic substrate should provide a minimum wet tensile strength of 1000 g/5 cm at 30 seconds at cure temperature. In another embodiment the minimum wet tensile strength at 30 seconds at cure temperature is at least 1500 g/5 cm.

Polymer binders that show a peel value of 35% to 200% (preferably 50% to 125%) of AIRFLEX 105 VAE emulsion control and a cure profile in which at least 55% of the ultimate wet strength is achieved in 30 seconds at the cure temperature, are considered important candidates as binders for a crepe process, especially a DRC process.

To be used in a crepe process, especially a DRC process, the polymer emulsions identified by the peel and cure tests described above, should have a viscosity of 5 to 80 cps at about 30% solids, and should be capable of being thickened to 100 cps with a thickener, such as a hydroxyethyl cellulose-based thickener. Viscosity is measured using a Brookfield viscometer, Model LVT, spindle #3 at 60 rpm. The emulsion polymers of this invention should also be stable at temperatures up to about 550° F. (288° C.). The polymer emulsions should produce a minimal amount of foam when pumped and beaten during a DRC process.

Binders identified by this invention can be used in crepe processes well known in the art. Examples of crepe processes are described in the publications listed in the "Background of the Invention" section of the specification. Nonwoven webs typically used in a crepe process are wood pulp (alone or blended with natural or synthetic fibers) processed by a dry (air-laid, carded, rando) or wet-laid process.

The amount of binder applied to the web can vary over a wide range; for example, about 5 to 40%; preferably 10 to 35% of the finished product. When the products are wiper products, it is desirable to keep the amount to a minimum.

The invention will be further clarified by a consideration of the following examples, which are intended to be purely exemplary of the use of the invention.

Example

Emulsion polymerization of vinyl acetate, ethylene, and N-methylol acrylamide was carried out in presence of various surfactant systems in a one-gallon stirred, stainless steel reaction vessel equipped with a jacket. In Run 1, reaction vessel was charged initially with 883.5 g of deionized water, 126.75 g of Disponil FES 32 IS, 25.625 g of Tergitol 15-S-20, 0.91 g of sodium citrate, 3.5 g of 50% aqueous citric acid, 2.3 g of 5% aqueous ferric ammonium sulfate and 312.0 g of vinyl acetate. While stirring, 240.0 g of ethylene was introduced below the surface of the liquid in the reaction vessel in order that the interpolymers would have a vinyl acetate:ethylene ratio of about 80:20. The reaction vessel was heated to 50° C. Upon equilibration, the following four aqueous solutions were intermittently added to the reaction vessel over the course of the reaction (on a delay basis); 15% sodium formaldehyde sulfoxylate (SFS), 3.0% t-butylhydroperoxide (t-bhp), 1246.0 g of vinyl acetate and 324.0 g of a 30% aqueous solution of N-methylol acrylamide (NMA). After three hours, the vinyl acetate delay was terminated. After four hours the NMA delay was complete and the other two delays continued for another 30 minutes. The reaction was terminated by cooling.

Using the same emulsion recipe as Run 1, several surfactant packages were examined. The viscosity, emulsion stability, accelerated sedimentation, peel (% of AIRFLEX 105 VAE emulsion control), and 30-second wet tensile strength (% of ultimate wet tensile strength) were measured.

Viscosity was measured using a Brookfield viscometer, Model LVT, spindle #3 @ 60 rpm and 77° F. (25° C.), at about 24 hours after preparation to allow for cooling and the finishing of any residual-free monomer.

Emulsion stability was measured by measuring the viscosity at 4 intervals: after forming the polymer emulsion; after 3 days in a 120° F. oven; after 1 week in a 120° F. oven; and after 2 weeks in a 120° F. oven.

Accelerated sedimentation was measured by taking a sample of product and diluting it in half with water, spinning it in a centrifuge for five minutes at a predetermined setting, e.g., 2800 rpm±100, and measuring the amount of precipitate forced to the bottom of the tube. When a one-gallon reactor is used, an accelerated sedimentation higher than 1% is considered unsatisfactory. However in a plant-size operation, up to about 3% is acceptable.

The peel value and the wet tensile strength of each of the binders were determined as described above.

The results of the tests are presented in the tables below:

TABLE 1

| Run | Anionic surfactant | Nonionic surfactant | Ratio of Anionic to Nonionic | % Solids | Viscosity, cps | Accelerated Sedimentation, % | Peel Value (% control) | 30-second wet tensile (% of ultimate) |
|---|---|---|---|---|---|---|---|---|
| 1 | Disponil FES 32 IS | Tergitol 15-S-20 | 1.86 | 52.9 | 660 | 1.0 | 100 | 79.4 |
| 2 | B-330S | Tergitol 15-S-20 | 1.86 | 53.2 | 532 | 4.0 | 47 | 70.0 |
| 3 | Rhodapex ES | Tergitol 15-S-20 | 1.86 | 53.2 | 632 | 2.5 | 73 | no data |
| 4 | FES 993 | Tergitol 15-S-20 | 1.86 | 53.1 | 160 | 8.0 | 57 | 60.9 |
| 5 | Steol 4N | Tergitol 15-S-20 | 1.86 | 53.1 | 348 | 2.0 | 48 | 66.6 |
| 6 | Texapon NSO | Tergitol 15-S-20 | 1.86 | 53.2 | 152 | 6.0 | 75 | 92.9 |
| 7 | Disponil FES 32 IS | Disponil 3065 | 1.86 | 53.3 | 600 | 3.0 | 175 | 78.4 |
| 8 | Disponil FES 32 IS | Disponil 1080 | 1.86 | 53.3 | 490 | 4.0 | 200 | 72.6 |
| 9 | Disponil FES 32 IS | TD-3 | 1.86 | 53.0 | 318 | 2.0 | 110 | no data |
| 10 | DOSS | Tergitol 15-S-20 | 1.86 | 57.0 | 86 | 1.0 | 135 | 47.3 |
| 11 | DOSS | Tergitol 15-S-20 | 1 | 53.4 | 372 | 0.5 | 100 | 34.2 |
| 12 | DOSS | Tergitol 15-S-20 | 3 | 53.1 | 54 | 1.0 | 35 | 35.7 |
| 13 | DOSS | Tergitol 15-S-20 | 0.33 | 53.3 | 116 | 0.5 | 130 | 43.7 |
| 14 | DOSS | Tergitol 15-S-20 | 0.67 | 60.3 | 474 | 1.5 | 105 | 84.8 |

TABLE 1-continued

| Run | Anionic surfactant | Nonionic surfactant | Ratio of Anionic to Nonionic | % Solids | Viscosity, cps | Accelerated Sedimentation, % | Peel Value (% control) | 30-second wet tensile (% of ultimate) |
|---|---|---|---|---|---|---|---|---|
| 15 | Tergitol 15-S-3 sulfate | Tergitol 15-S-20 | 2 | 55.8 | 600 | 10 | 68 | 72.1 |
| 16 | DOSS | Tergitol 15-S-3 | 0.67 | 60.5 | 228 | 3.5 | 90 | 61.4 |
| 17 | EST-30 | Makon TD-3 | 2 | 54.2 | 810 | 1.5 | 67 | 78.7 |

Disponil FES 32 IS = sodium laureth sulfate containing 4 moles of ethylene oxide, supplied by Cognis
Tergitol 15-S-20 = a secondary alcohol ethoxylate containing 20 moles of ethylene oxide, supplied by Dow
B-330S = sodium laureth sulfate (3 moles) supplied by Stepan
Rhodapex ES = sodium laureth sulfate (3 moles) supplied by Rhodia
FES 993 = sodium laureth sulfate (1 mole) supplied by Cognis
Steol 4N = sodium laureth sulfate (4 moles) supplied by Stepan
Texacon NSO = sodium laureth sulfate (2 moles) supplied by Cognis
DOSS = dioctyl sulfosuccinate
Tergitol 15-S-3 Sulfate = secondary alcohol ethoxylate sulfate (3 moles) supplied by Dow
EST-30 = sodium trideceth sulfate (3 moles) supplied by Rhodia
Disponil 3065 = lauryl alcohol ethoxylate (30 moles) supplied by Cognis
Disponil 1080 = lauryl alcohol ethoxylate (10 moles) supplied by Cognis
Makon TD-3 = tridecyl alcohol ethoxylate (3 moles) supplied by Stepan

TABLE 2

| Run | Cure Time, seconds | Dry Tensile, g/5 cm | Wet Tensile g/5 cm | Wet/Dry Tensile Ratio | 30 Second Wet Tensile, % of Ultimate |
|---|---|---|---|---|---|
| 1 | 30 | 4498 | 2153 | 47.9 | 79.4 |
| 1 | 180 | 4965 | 2713 | 54.6 | |
| 8 | 30 | 4023 | 2139 | 53.2 | 72.6 |
| 8 | 180 | 4738 | 2945 | 62.2 | |
| 10 | 30 | 4219 | 1822 | 43.2 | 47.3 |
| 10 | 180 | 5296 | 3849 | 72.7 | |
| 12 | 30 | 4318 | 1301 | 30.1 | 35.7 |
| 12 | 180 | 5346 | 3648 | 68.2 | |
| 15 | 30 | 4861 | 2433 | 50.1 | 72.1 |
| 15 | 180 | 5003 | 3376 | 67.5 | |
| 16 | 30 | 5029 | 2377 | 47.3 | 61.4 |
| 16 | 180 | 5249 | 3873 | 73.8 | |

The peel value and wet tensile data in Table 1 show that the binders of Runs 1-2, 4-8, and 14-17 can be considered for use as binders in crepe processes, especially DRC processes. The binders of Runs 10-13 would be inappropriate for consideration as potential binders in crepe processes because the 30-second wet tensile strength is less than 55% of the ultimate wet tensile strength of the binder. Without cure data, Runs 3 and 9 are questionable for use in a crepe process. The data in Table 2 show that, although the bonded product of Runs 10 and 12 has a wet tensile greater than 1000 g/5 cm at 30 seconds of cure time, the % of ultimate at 30 seconds is less than 55%. These data confirm that the binder of Runs 10 and 12 would not be appropriate for crepe processes.

What is claimed is:

1. In a crepe process that comprises applying a polymer binder to a nonwoven web, drying, and creping the nonwoven web on a creping drum, the improvement which comprises using an alkylphenol ethoxylate free aqueous polymer emulsion binder formed by aqueous free radical emulsion polymerization of one or more ethylenically unsaturated monomers and one or more crosslinking monomers, said binder having a peel value of 35% to 200% of a standard alkylphenol ethoxylate-based vinyl acetate-ethylene polymer emulsion control, a cure profile in which 55% cure is achieved within 30 seconds of being exposed to a temperature required for cure, and a wet tensile strength at 30 seconds of cure of at least 1000 g/5 cm.

2. The crepe process of claim 1 wherein the one or more crosslinking monomers are selected from the group consisting of an N-alkylol acrylamide, an N-alkylol methacrylamide, i-butoxy methylacrylamide, acrylamidoglycolic acid, acrylamidobutyraldehyde, and a dialkyl acetal of acrylamidobutyraldehyde, wherein alkyl is 1 to 4 carbons.

3. The crepe process of claim 2 wherein the peel value is 50 to 125% of the polymer emulsion control.

4. The crepe process of claim 2 wherein the wet tensile strength at 30 seconds of cure is at least 1500 g/5 cm.

5. The crepe process of claim 1, wherein the process is a double recrepe process comprising applying said polymer binder to one side of said nonwoven web, drying, and creping the nonwoven web on said creping drum, followed by applying said polymer binder to the opposite side of the nonwoven web and again drying and creping the nonwoven web on a creping drum.

6. The double recrepe process of claim 5 having a viscosity of 5 to 80 cps at about 30% solids.

7. The crepe process of claim 1 wherein the binder is a copolymer of ethylene, vinyl acetate and one or more crosslinking monomers selected from the group consisting of an N-alkylol acrylamide, an N-alkylol methacrylamide, i-butoxy methylacrylamide, acrylamidoglycolic acid, acrylamidobutyraldehyde, and a dialkyl acetal of acrylamidobutyraldehyde, wherein alkyl is 1 to 4 carbons.

8. The crepe process of claim 7 wherein the one or more crosslinking monomers is N-methylol acrylamide.

9. A creped nonwoven web prepared by the process of claim 1.

10. A double recreped nonwoven web prepared by the process of claim 5.

* * * * *